(12) United States Patent
Amani

(10) Patent No.: US 9,058,143 B1
(45) Date of Patent: Jun. 16, 2015

(54) SYSTEM FOR PROVIDING AN ALTERNATIVE CONTROL INTERFACE TO SPECIALTY PRINTING DEVICES

(71) Applicant: Majid Amani, East Greenwich, RI (US)

(72) Inventor: Majid Amani, East Greenwich, RI (US)

(*) Notice: Subject to any disclaimer, the term of this patent is extended or adjusted under 35 U.S.C. 154(b) by 0 days.

(21) Appl. No.: 14/463,626

(22) Filed: Aug. 19, 2014

Related U.S. Application Data

(60) Provisional application No. 61/869,615, filed on Aug. 23, 2013.

(51) Int. Cl.
*G06F 15/00* (2006.01)
*G06K 1/00* (2006.01)
*H04N 1/00* (2006.01)
*G06F 3/12* (2006.01)

(52) U.S. Cl.
CPC ............ *G06F 3/1279* (2013.01); *G06F 3/1228* (2013.01); *G06F 3/1243* (2013.01); *G06F 3/1276* (2013.01); *G06F 3/1284* (2013.01)

(58) Field of Classification Search
CPC ... G06F 3/1279; G06F 3/1228; G06F 3/1243; G06F 3/1276; G06F 3/1284
USPC .................................. 358/1.1, 1.15, 1.14, 1.6
See application file for complete search history.

(56) References Cited

U.S. PATENT DOCUMENTS 7,573,845 B2 * 8/2009 Harnisch et al. ............... 370/329
2007/0097161 A1 * 5/2007 Ejiri et al. ......................... 347/5

* cited by examiner

*Primary Examiner* — Douglas Tran
(74) *Attorney, Agent, or Firm* — Kenneth J. Lukacher Law Group; R. S. Rosenholm

(57) ABSTRACT

The invention provides an alternative applications programming interface (API) for a software application to interface with and to control the operation of a variety of one or more specialty printing devices. The alternative API provides a superset of control functionality relative to an API that would typically be provided by a specialty printing device driver. In some embodiments, this alternative API is provided via a specialty printing module (SPM) that is remotely accessible to a software application via a computer network. The SPM can provide for interface and control of specialty printing devices that would otherwise be un-accessible to a software application via a specialty printing device driver, and can provide such locally or remotely accessible functionality to the software application, without necessarily requiring employment of a specialty printing device driver.

23 Claims, 7 Drawing Sheets

ABC FOOD CORPORATION

P.O. Box 1234
Sometown, MA 03999
1-800-800-8000

Store: Food Shops 2201
ROUTE 117
Warwick, RI 02912
CUSTOMER # 024985
06/14/2012  10:28:41 PM

| Qty | UPC | Item Description | Price | Ext Price |
|---|---|---|---|---|
| 1 | 4000112202 | Sparklg Bev, Orange, 11OZ | 19.65 | 19.65 |
| 1 | 4000112203 | Detox Bev, Lemon, 16OZ | 36.46 | 36.46 |
| 7 | 4000112204 | Instant Natural Bev, 7OZ | 13.22 | 92.54 |
| 9 | 4000112205 | Sparklg Bev, Apple, 25OZ | 13.57 | 122.13 |
| 9 | 4000112206 | Key Lime Soda, 24PK, 12OZ | 24.00 | 216.00 |
| 5 | 4000112207 | Sparkling, Limonata, 11OZ | 19.75 | 98.75 |
| 32 | | Subtotal, Beverages | | 585.53 |
| 8 | 4000112310 | Chocolate Fudge Birthday | 34.89 | 279.12 |
| 8 | 4000112311 | Chocolate Double Dare, 24OZ | 29.60 | 236.80 |
| 8 | 4000112312 | Cherry-Choco Lovers Cake | 32.95 | 263.60 |
| 8 | 4000112313 | Pineapple Rum Cake, 33OZ | 26.92 | 215.36 |
| 8 | 4000112314 | Key Lime Rum Cake, 16OZ | 14.58 | 166.64 |
| 8 | 4000112315 | Cinnamon Walnut Coffee | 20.95 | 167.60 |
| 5 | 4000112316 | Carrot Cake, 44OZ | 45.98 | 229.90 |
| 15 | 4000112317 | Yellow Cake Mix, 4PK, 15OZ | 23.36 | 350.40 |
| 68 | | Subtotal, Cakes | | 1,859.42 |
| | | Total | | $2,444.95 |

SYSTEM FOR PROVIDING AN ALTERNATIVE CONTROL INTERFACE TO SPECIALTY PRINTING DEVICES

This document is a United States non-provisional utility patent application that claims priority and benefit to U.S. (utility) provisional patent application having Ser. No. (61/869,615) (Confirmation No. 9588), that was filed on Aug. 23, 2013 and that is entitled "SYSTEM FOR PROVIDING AN ALTERNATIVE CONTROL INTERFACE TO SPECIALTY PRINTER DEVICES", and which is incorporated herein by reference in its entirety.

BACKGROUND OF THE INVENTION

Specialty printers are specially designed devices that transfer information onto various types of portable media. These types of devices are typically configured to be peripheral to a computer system and perform functionality that is typically not directly available to most computer systems. Hence these devices are characterized as being special, as they are atypical relative to standard printers sold in high volume within the desktop computer market.

The discussion above is merely provided for general background information and is not intended to be used as an aid in determining the scope of the claimed subject matter.

BRIEF DESCRIPTION OF THE INVENTION

The invention provides an alternative applications programming interface (API) for a software application to interface with and control the operation of a variety of one or more specialty printers, which are also referred to herein as specialty printing devices. The alternative API provides a superset of control functionality relative to an API that is typically provided by a specialty printing device driver. In some embodiments, the alternative API is provided via a specialty printing module (SPM) that is remotely accessible to a software application via a computer network. The SPM can provide for interface and control of specialty printing devices that would otherwise be un-accessible to a software application via a specialty printing device driver, and can provide such locally or remotely accessible functionality to the software application without necessarily requiring employment of a specialty printing device driver.

This brief description of the invention is intended only to provide a brief overview of subject matter disclosed herein according to one or more illustrative embodiments, and does not serve as a guide to interpreting the claims or to define or limit the scope of the invention, which is defined only by the appended claims.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention can encompass other equally effective embodiments. The drawings are not necessarily to scale. The emphasis of the drawings is generally being placed upon illustrating the features of certain embodiments of the invention. In the drawings, like numerals are used to indicate like parts throughout the various views. Differences between like parts may cause those parts to be indicated with different numerals. Unlike parts are indicated with different numerals. Thus, for further understanding of the invention, reference can be made to the following detailed description, read in connection with the drawings in which:

FIG. 7 illustrates a report that is rendered (printed) onto media of a specialty printer.

DETAILED DESCRIPTION OF THE INVENTION

Figure 1:
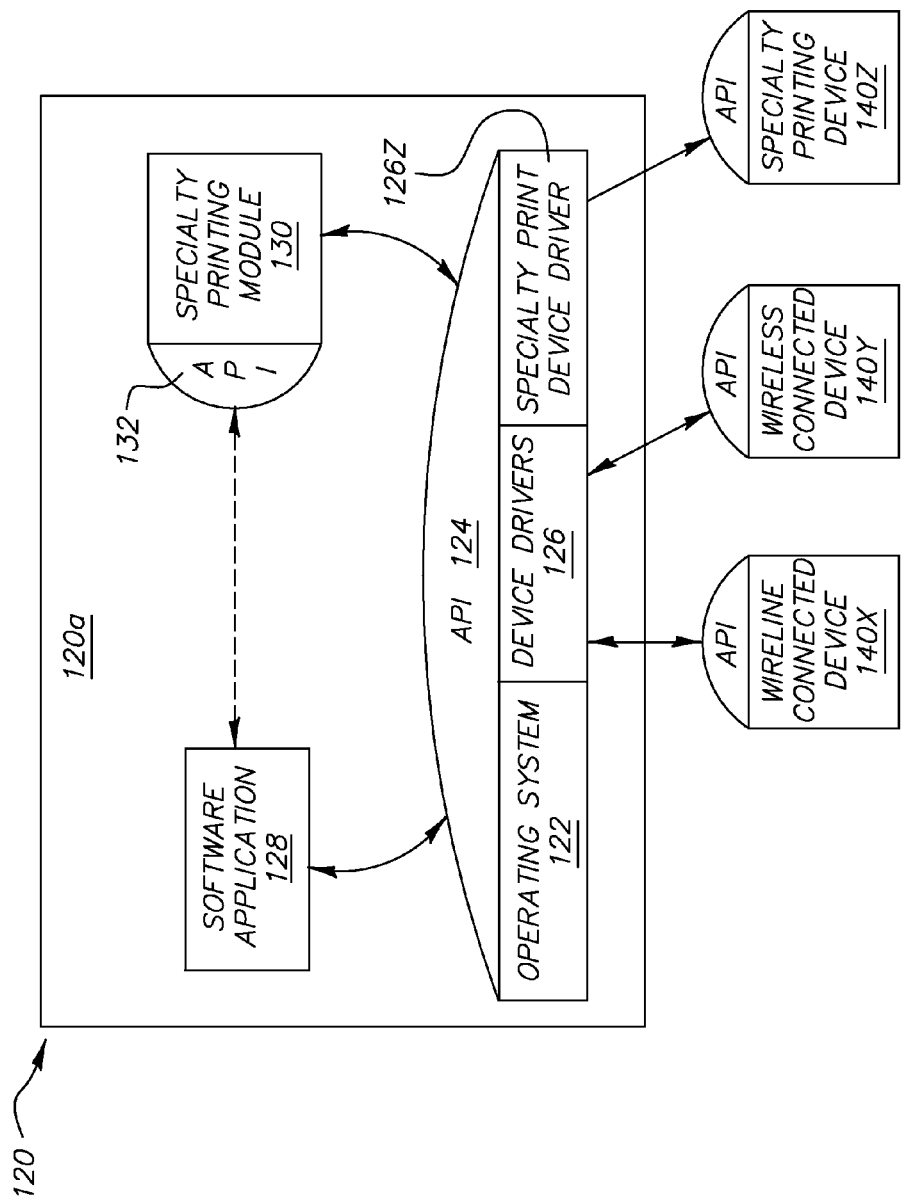
FIG. 1 illustrates communication between a specialty printing module and other software executing within a virtual address space of a computer system.

FIG. 1 illustrates communication between a specialty printing module 130 and other software executing within a virtual address space 120*a* of a computer system 120. As shown, a software application 128 communicates with a specialty printing module 130 via an applications programming interface (API) 132 of the specialty printing module 130.

The software application 128 communicates with the SPM 130 via a first communications channel provided by the operating system (OS) 122. For example, in some embodiments, this first communications channel is a socket communication mechanism provided by the operating system 122 to the software application 128 and to the specialty printing module (SPM) 130. To exercise this socket mechanism, the software application 128 and the SPM 130 each communicate with the operating system 122 via exercise of an applications programming interface (API) 124 provided by the operating system 122 itself.

In other embodiments this communications channel is implemented via OpenURL( ) method call which is available within the applications programming interface (API) of a Java programming environment. A uniform resource locator (URL) is applied as an address of the SPM 130. A URL is a type of uniform resource identifier (URI). Another type of URI is a uniform resource name (URN).

In this circumstance, the URL address of the SPM 130 is employed by the software application 128 to access and to exercise the programming interface of the SPM 130. In other words, the SPM 130 programming interface is exercised by another software component, such as the software application, through the URL address. Also, in these circumstances, the software application 128 and the SPM 130 can reside upon the same computer and are local to each other, or can each reside on different computers. These different computers can be located proximate to or remote from each other. In other embodiments, a uniform resource name (URN) can be employed and mapped to a URL. Similar URL address based mechanisms can be employed to provide a communication for specialty printer discovery (See FIG. 6)

The operating system 102 communicates with various devices 140*x*-140*z* via a set of device drivers 126, including device driver 126*z*, which function as an extendable and configurable portion of the operating system 122. The operating system 122 interfaces with a wireline connected device 140*x* via a wireline connected device driver included within the set of device drivers 126. The operating system 122 interfaces with a wireless connected device 140*y* via a wireless connected device driver that is included within the set of device drivers 126. The operating system 122 interfaces with a specialty printer device 140*z* via the specialty printer driver 126*z*, that is also included within the set of device drivers 126.

In terms of functionality, the device drivers 126 each have an applications programming interface (API) that typically provides functional control of a device that is specific to a design of that particular device 140*x*-140*z*. This type of functional control is enabled via a set of commands that reflect a specific design of a device 140*x*-140*z* and that are processed when received by the device 140*x*-140*z*. These commands also referred to as providing a lower level (physical) access to and control of each of the devices 140*x*-140*z*.

Via the operating system 122 and its device drivers 126, the software application 128 can also communicate with each of the devices 140*x*-140*z*. However, such communication is limited to the limitations within each of the set of device drivers 126, including the device driver 126*z*. Typically, a device driver API provides access to specific functions of the device. As a result, the software application 128 is also limited to communicating (invocation of) specific functional commands of each of the devices 140*a*-140*z* via the operating system 122 and its device drivers 126.

Conversely, the specialty printing module 130 provides an alternative and different applications programming interface (API) 132 relative to that provided by the API 124 of the operating system 122 via its device drivers 126. Like that provided by the operating system 122, the specialty printing module (SPM) API 132 provides access to specific functions of a device 140*x*-140*z* and further provides a superset of the functional control that is provided by the operating system 122 via its drivers 126. This superset includes higher level functions for which the software application 128 can invoke (communicate) to the device 140*z* via the specialty printing module (SPM) API 132.

For example, the software application 128 can communicate a command that prints a report onto label media. The report can include multiple tables and fields that collectively define a printing of a label onto a product to be placed on sale. Some of these fields store values that are fixed while other fields store values that are accessed from other sources, or that are computed during the construction of the report. Some of these non-fixed and computed values are based upon limitations (design characteristics) that are specific to each of the devices 140*x*-140*z*. The report may also include bar codes and other graphics and can define an arrangement of fields having unusual patterns.

Placement (printing) of portions of the report, such as of a location of numerical fields and barcodes, may be subject to alignment and placement at locations onto printable output media that are based and determined upon one or more physical limitations (design characteristics) of the specialty printing device 140*z*. Rather than the software application 128 determining and specifying at what specific location a field should be placed (printed), via factoring characteristics and limitations of the device 140*x*-140*z*, the specialty printing module 130 will perform such a determination based upon general rules selected by the software application 128 and limitations (design characteristics) of the particular device 140*x*-140*z*.

These general rules are embedded into a report specification module (See FIG. 4), which can be executed by the software application 128. The software application 128 also invokes a report builder module to generate commands that are targeted and directed to a specific device 140*x*-140*z*. The specialty printing module 130 delivers the device targeted commands to the device 140*x*-140*z* via the operating system 122 and at least one of its device drivers 126.

In some circumstances, the specialty printing device 140*z* has a universal serial bus (USB) wireline connection to the computer system 120. In this circumstance, the operating system 122 and at least a USB device driver would be employed to communicate (deliver) the device targeted commands from the specialty printing module 130 to the specialty printing device 140*z*. In other circumstances, the specialty printing device 140*z* has a wireless WiFi communication connection to the computer system 120. Likewise, in this circumstance, the operating system 122 and at least a WiFi device driver would be employed to communicate (deliver) the device targeted commands from the specialty printing module 130 to the specialty printing device 140*z*.

Figure 3:
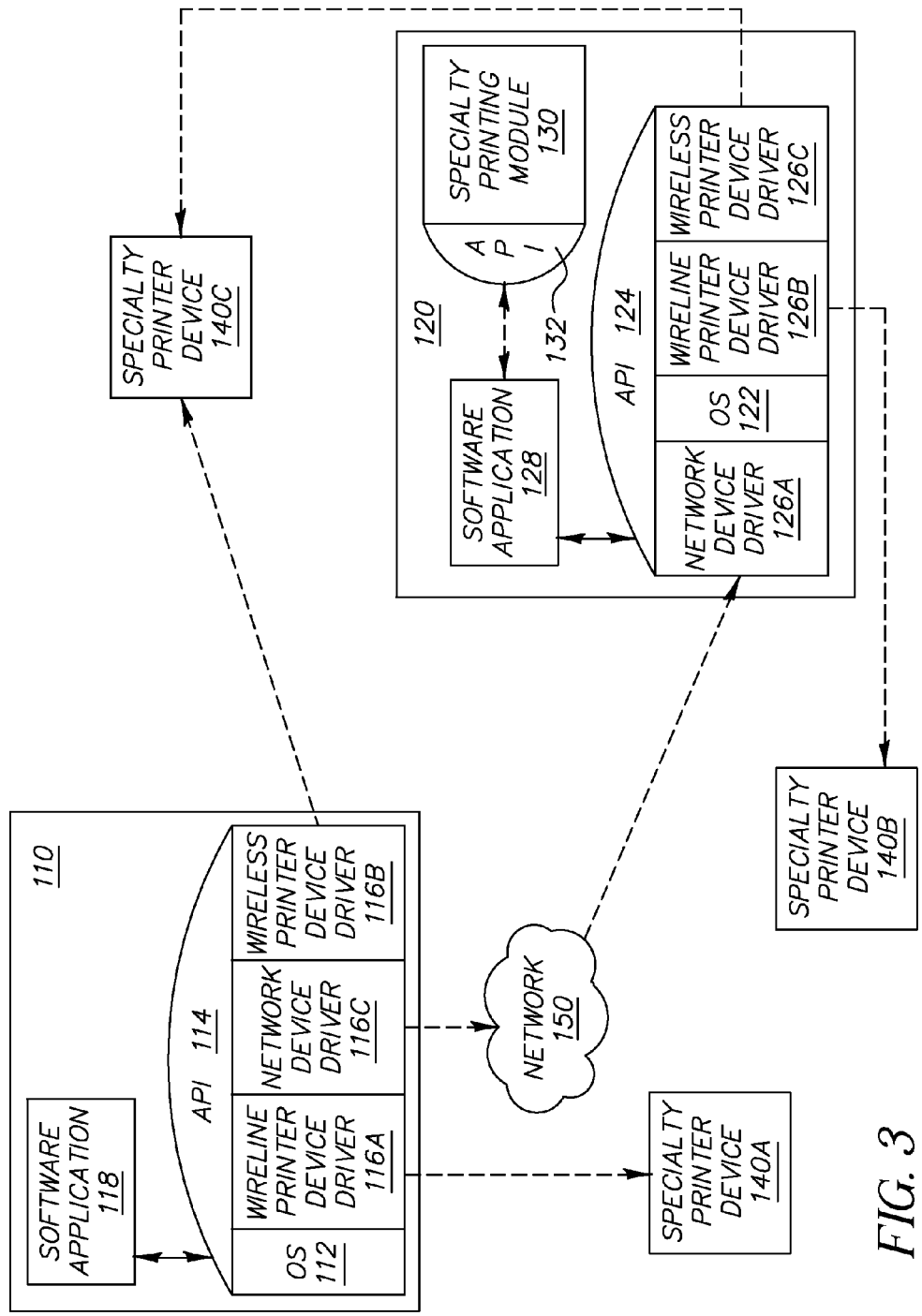
FIG. 3 illustrates communication between a plurality of host computer systems and a variety of output devices (specialty printers).

Furthermore, as shown in FIG. 3, another software application 118 executing on another computer system 110 may communicate with the specialty printing module 130 that is executing on this computer system 120, in order to access and control a specialty printing device that is not directly accessible from the another computer system 110 and upon which the software application 118 resides. At least one of various types of communications channels can be employed between the software application 118 and the specialty printing module 130 to enable communication to each other through a network 150. Such a communications channel, such as a socket to socket or OpenURL( ) accessed communication channel, for example, is typically accessible their respective operating systems (OS) 112, 122 via their respective applications programming interfaces (API) 114, 124.

Figure 2:
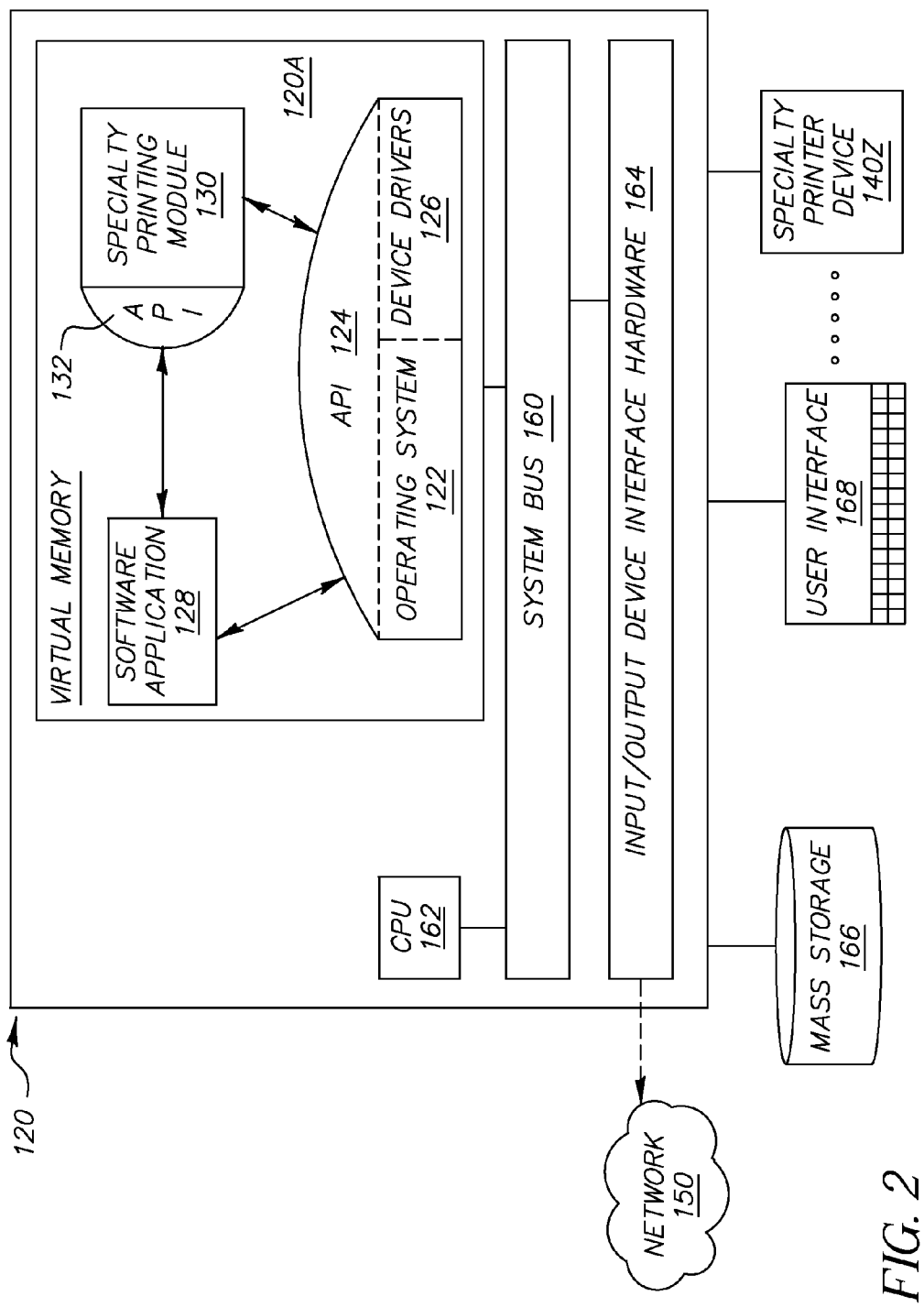
FIG. 2 illustrates a simplified representation of hardware and software residing within a host computer system.

FIG. 2 illustrates a simplified representation of hardware and software residing within the host computer system 120, also referred to herein as a computing platform 120. As shown, the computer system 120 includes at least one system bus 160 which is electronically connected to a central processing unit (CPU) and random access memory (RAM), which is employed to provide a virtual address space (virtual memory) 120*a* for storage of software executing on the computer system 120. Device interface hardware 164 is also electronically connected to the system bus 160 and is employed for performing transfer (input and output) of data between components 120*a*, 162 that are internal to the computer system 120 and devices 140*z*, 166-168 that are connected to it 120. A mass storage device, such as a hard disk 166 or other non-volatile data storage device, and user interface hardware, such as collectively a liquid crystal display (LCD) screen with mouse and a keyboard 168, are at least among the devices that are connected to the computer system 120. Also note that network interface hardware is employed for electronic connection to a communications network 150 and is not explicitly shown here.

FIG. 3 illustrates communication between a plurality of host computer systems 110, 120 and a variety of specialty printer devices 140*a*-140*c*. As shown, a host computer 110 includes hardware and various software components like that shown for computer system 120 in FIG. 2. The host computer system 110, also referred to herein as a computer system or a computer 110, has software including an operating system 112.

The operating system 112 includes an applications programming interface (API) 114, one or more device drivers 116*a*-116*b*, also referred to herein collectively as the device drivers 116 of computer 110. These device drivers 116 include such as one or more network device driver(s) 116c, and one or more specialty printer device drivers 126a-126b. These specialty printers 140a-140c are also referred to herein as specialty devices 140a-140c, because some specialty printers function more as an specialty type of device than an actual printing device.

The operating system 112 includes an API 114 that is a programming interface between the operating system 12 and each of one or more software application programs 118 executing on the computer system 110. The network device driver 116c interfaces with electronic hardware (electronics) that provides access to a particular type of communications network 150. This hardware may interface with a network having a wired topology, referred to herein as a wired or wireline type of network, such as an Ethernet network, or this hardware may interface with a network having a wireless topology, referred to herein as a wireless type of network, such as the wireless IEEE 802.11 network.

Device drivers may be assigned to multiple categories that overlap. For example, a device driver that interfaces with an Ethernet network would fall into both a network communications device driver and a wireline connected device driver category, and a device driver that interfaces with an IEEE 802.11 network, would fall within both a network communications device driver and wireless communications device driver category.

As shown in FIG. 3, the computer 110 has a wireline connection to a type of specialty printing device 140a, which is also generally referred to herein as a specialty output device, or as a specialty printer 140a. A specialty printer, is a type of output device that performs functions that are outside the capabilities of conventional type of paper document printer. A specialty printer can be designed to transfer information in the form of ink deposited onto media, or transfer information that is in a form other than ink, such as an electrical encoding of a numerical value into or onto appropriate media designed to store such a value.

Although a specialty output device (printer) has capabilities outside that of a conventional document printer, in some embodiments, a specialty printer can print a document onto media, such as in the form of ink onto paper media, or as in the form of ink onto non-paper media, or as in the form of depositing other than ink onto non-paper media. However, because some embodiments of a specialty printer can effectively print a document in some manner, such embodiments of a specialty printer may not be able to print a document as wells as, for example as quickly or as accurately, as some conventional document printers.

As an ink depositing type of printer, a specialty printer can be designed to deposit ink onto a special type of media, such as label media, or to deposit ink onto more common types of media, such as onto one or more sheets of paper for the purpose of printing documents. Label media, can be manufactured into many forms, and is typically manufactured and packaged into a roll of media, and is cut into individual sheets as needed. As cut, these sheets have an adhesive rear side and a printable forward side. The forward side is designed to store information in the form of ink deposits arranged to represent text fonts and graphics and images. These deposits can also include various types of printed bar code information. The text fonts can be arranged in various patterns, including horizontal lines, or other than horizontal lines, and can be patterned and directed along a horizontal direction, along a vertical direction and/or along a diagonal direction, for example.

Alternatively, a specialty printer can for example, store a numerical code inside of media that functions as an radio frequency identification (RFID) transponder. Such media is typically non-paper based media, such as that made from a polymer. The media may be packaged in a form that requires cutting or may be pre-separated and optionally stacked, prior to or after processing (printing) of the media. In this circumstance, a processed unit of media could function as an RFID transponder.

The media, whether or not it is made from a particular type of material, such as some type of paper or polymer, may require some form of delimitation and separation via a cutting or tearing action, to delimit and separate each unit of media. For example, with respect to label media, a unit of media could constitute one processed (printed) label. With respect to RFID media, a unit of media would be a processed (numerical code stored) RFID transponder.

As shown in FIG. 3, the computer 110 communicates with another computer 120 via a communications network 150. The computer 120 may be located within the same room, or the same building, may be located many miles from computer 110. As shown, the computer 110 has a direct connection to (1) output device, referred to herein as specialty printer 140a. The computer 120 has a direct connection to (2) associated output devices, also referred to herein as specialty printers 140b-140c. Note that each of the specialty printers 140a-140c, are not the same type of printer and are instead each designed to function as a different type of output device (specialty printer).

The computer 120 has a specialty printing (software) module 140 that interfaces with an operating system 122, via an API 124 of the operating system 122. The specialty printing module 130 also interfaces with a software application 128 residing and executing on the same local computer 120. The specialty printing module 130 also provides an application programming interface (API) 132 for one or more executing software applications 118, that reside on the remotely located computer 110.

This API 132 of the specialty printing module 130 is designed to provide a programming interface for local (128) and remotely located (118) software applications 118, 128 to interface with a particular specialty printer 140a-140c. A first portion of the API 132 is characterized as processing device specific (low level) commands, meaning that the specialty printing module 130 passes through commands received from the software application 118, 128 to the specialty printer 140a-140c. A second portion of the API 128 is characterized as processing other (high level) commands, meaning that the specialty printing module responds to directly, or translates a high level command into a set of one or more lower level commands for delivery to the particular specialty printer 140a-140c.

The design of the API 132 is an alternate and unique API as compared to what is typically provided by a device driver 116, 126. Furthermore, this API 132 is designed to be accessible from both local software applications 128 that are executing on the same computer 120, and designed to be accessible from remote software applications 118 via a network 150, that are executing on other remote computer systems, such as computer 110, for example.

Via the specialty printing module 130 and network 150, the software application 118 executing on computer 110, can access either or both of the remotely located specialty printers 140b-140c. Furthermore, this remotely located software application 118 can access these printers via a uniformly designed API 132 that is provided by the specialty printing module 140. Likewise, the software application 128 that resides local to computer 120, can also access and interface with these specialty printers 140b-140c, which are directly accessed by computer 120, via the same uniformly designed API 132 provided by the specialty printing module 130.

Without the specialty printing module 130, the software application 118 would have no access to the specialty printers 140b-140c, given that there is no other mechanism available to the software application 118 providing such access. Without the specialty printing module 130, the software application 128 would be required to interface with the specialty printer 140b via a device driver 126b of a first particular design and required to interface with specialty printer 140c via device driver 126c of a second particular design. Because specialty printers 140b and 140c each have a different function and design relative to each other, the device drivers 126b and 126c would likewise be expected to each have a different design relative to each other, and furthermore, each of the device drivers 126b and 126c would each likely provide a API that is separately and differently designed relative to each other.

With separate and differently designed device drivers 126b-126c, the software application 128 would be required to include additional software to separately interface with each of both of the device drivers 126b-126c. Furthermore, at least one or both of these device drivers 126b-126c will likely provide a more limited programming interface, and likely provide a programming interface that is a subset of that provided by the specialty printing module (SPM), to each specialty printer 140b-140c.

Importantly, the specialty printing module 130 provides to the software application 118 of computer 110, an indirect connection to the (2) specialty printers 140b-140c of computer 120, via the API 132 of the specialty printing module 130. The specialty printing module 130 also provides its API 132 to a software application 128 that is executing local to it 130 on the computer 120.

Figure 4:
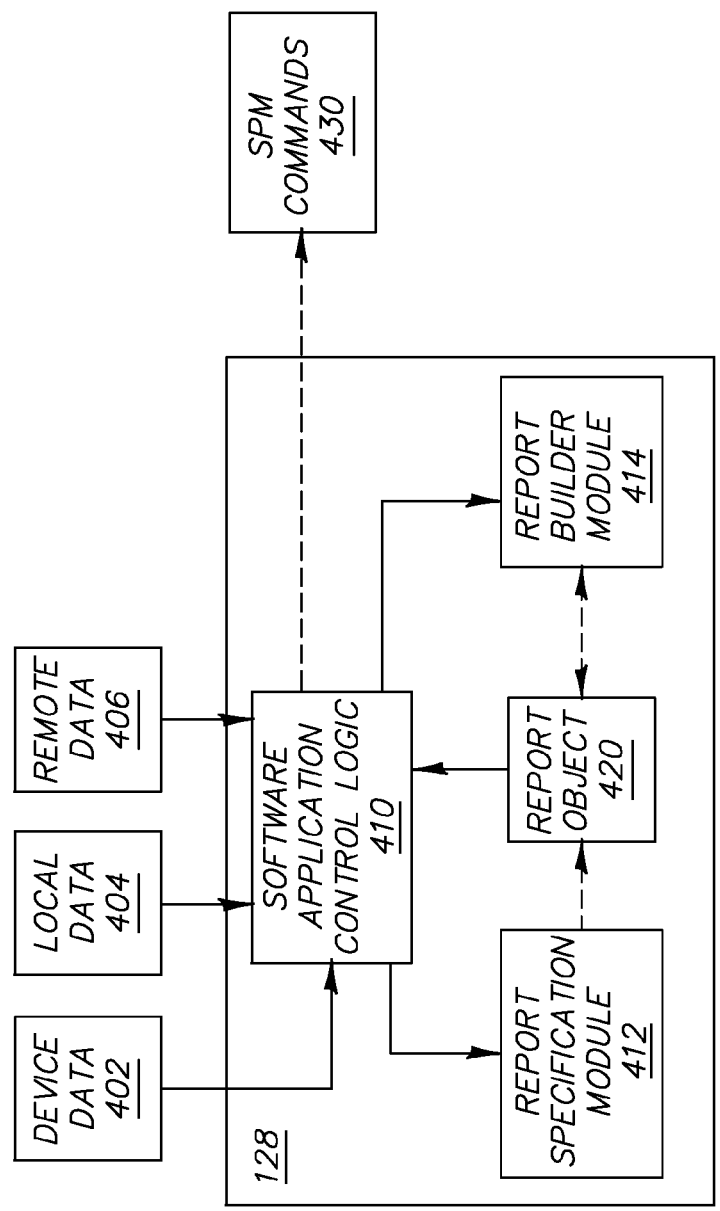
FIG. 4 illustrates a simplified representation of the internals of an embodiment of the software application of FIG. 3.

FIG. 4 illustrates a simplified representation of the internals of an embodiment of the software application of FIG. 3. As shown, the software application 128, includes control logic 410 that is designed to control operation of the software application 128. Via execution of the control logic 410, the software application 128 inputs device data 402, local data 404 and/or remote data 406.

Device data 402 is encoded information that describes characteristics and limitations of a specialty printing device 140a-140c whose operation is to be controlled via commands within a report that are to be generated by the software application 128. Data, including device data 404, can also be accessed from a local source 404 and/or from a remote source 406. Such data can include for example, static information such as a number of columns for printing, or include dynamic information such as date and time information.

The software application control logic 410 executes a report specification module 412 for defining a structure of a report. The structure of the report is defined in terms of one or more tables, fields, barcodes etc. The report can define a sales receipt, optionally with total and subtotal values. The report specification module 412 generates a report object 420 which functions as a template for a report to be generated. The software application control logic 410 further initiates execution of a report builder module 414 that functions to complete construction of the report object 420. Within the report object 420, commands are generated to control operation of the specialty printing module (SPM) 130 and to control operation of a targeted specialty device 140a-140c. Collectively, these commands are referred to herein as specialty printing module (SPM) commands 430. These SPM commands are communicated from the software application 128 to the specialty printing module 130.

Figure 5:
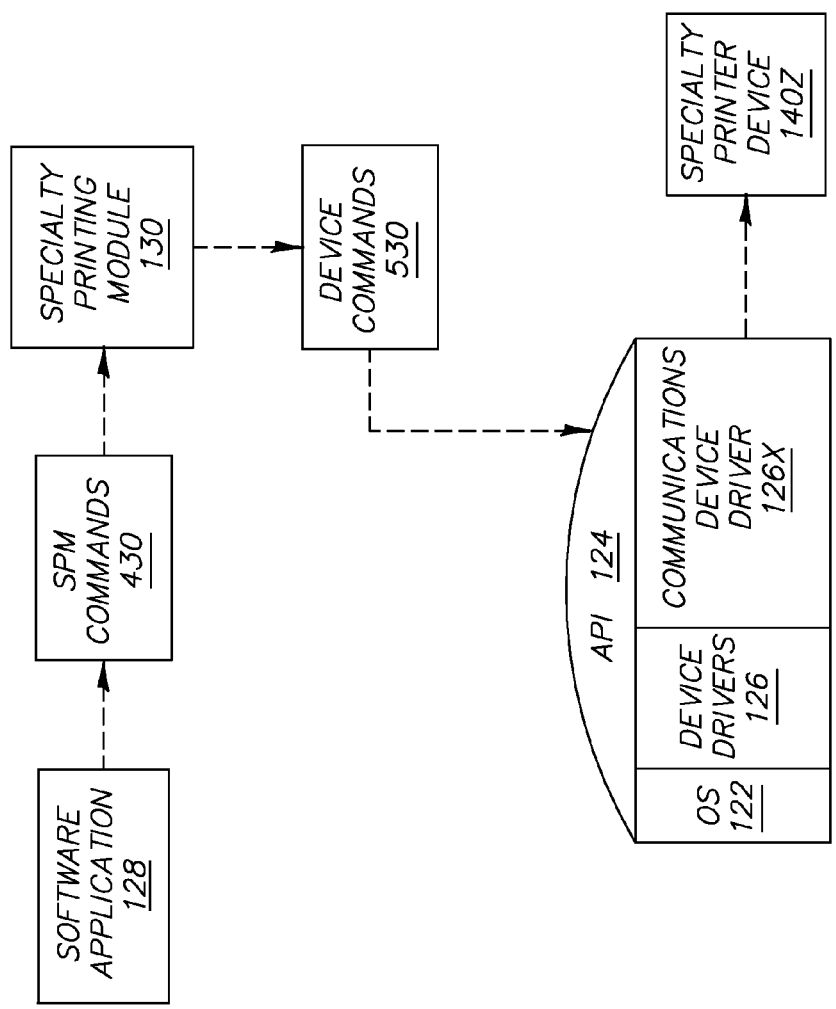
FIG. 5 illustrates a simplified representation of communication between the software application, specialty printing module, operating system and the specialty device.

FIG. 5 illustrates a simplified representation of communication between the software application 128 and the specialty printing device 140z via a communications device driver 126x. As shown, the software application 128 communicates SPM commands 430 to the specialty printing module 130 as described in association with FIG. 4. The specialty printing module 130 interfaces with the API 124 of the operating system 122 to communicate the device specific commands 530 to the specialty printing device 140z. In a pass through mode, device specific commands embedded into the SPM commands 430 are passed through the SPM 130 and relayed to the specialty device 140z.

Notice that the SPM 130 communicates the device commands 530, not through a specialty printer device driver 126, but instead communicates the device commands 530 via a communications device driver 126x to the specialty printing device 140z. A communications device driver 126x is designed for a specific type of communication and is not specifically designed for control of the specialty printing device.

For example, in some circumstances, the specialty device driver 126x is connected via a universal serial bus (USB) wireline type of connection. In this circumstance, the communications device driver 126x is a universal serial bus (USB) device driver. This USB device driver 126x, is a device driver that is not required to be designed in accordance with a specific set of design characteristics of the specialty printing device 140z. In other words, no device driver that is specifically designed for the specialty printing device 140z is required to communicate with and control the specialty printing device 140z.

Likewise, in another circumstance, communication with an Ethernet connected specialty printing device 140z would simply require an Ethernet driver 126z. And likewise, in another circumstance, a WiFi connected specialty printing device 140z would simply require an WiFi driver. This type of arrangement unburdens the operating system 122 and its drivers 126 from being required to have device specific device drivers installed for all of its device drivers. Furthermore, it unburdens the operating system 122 from obtaining version updates for such specialty device drivers.

Figure 6:
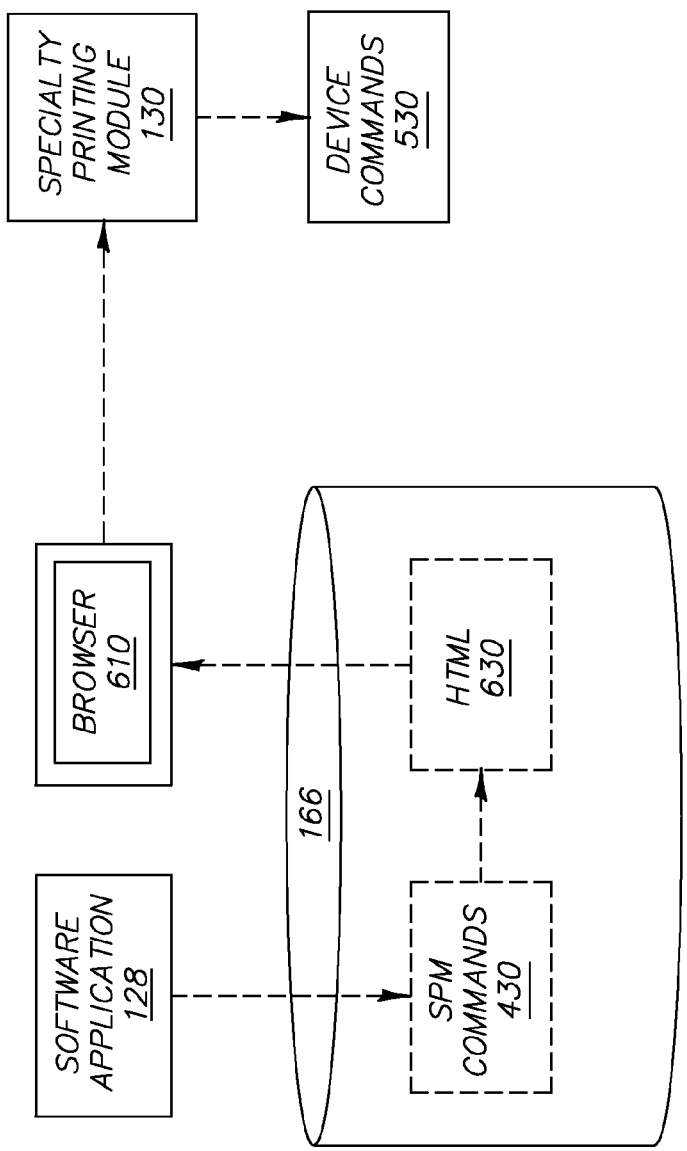
FIG. 6 illustrates a simplified representation of communication between the software application, an HTML browser and the specialty printing module.

FIG. 6 illustrates a simplified representation of communication between the software application 128, an HTML browser 610 and the specialty printing module 130. As shown, the software application 128 can store SPM commands 430 into a set of hypertext markup language (HTML) 630. The HTML 630 is input and processed by a (Internet Web) browser program 610.

The HTML 630 can direct the browser program 610 to display a list of actions to be executed at the option of a user that is interfacing with the browser program 610. Each action can be represented as text that is read by the user. Upon activation (selection) of the text by the user via a pointing device or keyboard input, for example, the browser program 610 communicates the SPM commands 430 to the specialty printing module (SPM) 130. And as described in association with FIG. 4, the SPM 130 module communicates any device specific commands 530 to the specialty printing device 140z via the operating system 122 and at least one of its device driver(s) 126x.

The SPM 130 receives and processes commands that are transmitted directly or indirectly from a software application 128. In some embodiments, the programming interface that resides in between the SPM 130 and the software application 128, is configured to enable transfer of one or more uniform resource locator (URL) addresses from the software application 128 to the SPM 130. These URL addresses can include a success URL address and a failure URL address. A success URL address is a URL address of a software component, typically the URL address of the software application 128 itself. A failure URL address may be the URL address of the software application 128 itself, or alternatively, a URL address of a software component other than the software application 128.

Upon successful completion of command processing, the SPM 130 will interact with the operating system to cause transition to execution of a software component addressed by the success URL address. Alternatively, if the command processing is unsuccessful, the SPM 130 will cause the operating system to transition to execution of a software component addressed by the failure URL address.

Optionally, the programming further enables return to the software application 128 of any data returned by the specialty printer 140x in response to its communication with the specialty printing module 130, while processing printing commands.

In some embodiments, the browser program is configured to list a specialty printer discovery action, that when selected, will search for and discover uniform resource locator (URL) addresses for each available specialty printer that resides within a particular network computing environment. Upon selecting a URL for a specialty printer, that printer can be communicated with from the software application 128 via the SPM 130.

FIG. 7 illustrates a report that is rendered (printed) onto media of a specialty printer. A report is defined to include one or more tables, while each table is defined to include one or more fields. As shown, an embodiment of a report 710 includes (3) tables 736a-736c. These tables 736a-736c can be rendered (printed) as a report that constitutes one label that is printed onto an adhesive-backed media, or rendered onto an electronic user interface display, or rendered (printed) onto a portion of a roll of journal receipt paper, for example.

Each table 736a-736c is positioned either at an absolute location within boundaries of the report 710, or positioned at a location that is relative to a location of another table that is included within the same report 710. Each table 736a-736c includes one or more fields. As shown, the table 736c includes fields 737a-737c which each appear to function as a title or label of a column of text within the report 710.

Each field 737a-737c is positioned either at an absolute location within boundaries of the table 736c, or is positioned at a location that is relative to that of a location of another field that is included within the same table 736c. Each field represents a portion of data of a report that is rendered (printed), for example, as text, a barcode, an image or the like.

Data of a report is divided into one or more data items. For example, a data item can be alphanumeric text that identifies a food item for sale, or alternatively could be alphanumeric text to quantify a price of a purchased food item. Each field, such as fields 748a-748e can include one or more data items. For example, field 748c can include (3) data items that are rendered and delimited by at least one comma text character. As a result, a definition of a report can vary substantially in relation to other reports, depending upon the number and types of defined tables, and upon the number and types defined fields within each defined table, and as a result, can specify a wide variety of arrangements of rendered (printed) information.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for enabling operation of a specialty printer to be controlled from a software application; said apparatus including:
    a specialty printing module that is configured for communicating with a software application and configured for communicating with a specialty printer, via at least one communication channel; said software application executing on a first platform and said specialty printing module executing on a second computing platform; and wherein
    said specialty printer is a device having functionality for transferring information onto media and wherein control of at least some of said functionality is not directly accessible to said software application via said operating system or its associated device drivers at a first time; and wherein
    said specialty printing module provides control to said software application of at least a portion of said at least some of said functionality, that is not otherwise provided to said software application via said at least one of an operating system and its associated device drivers.

2. The apparatus of claim 1 including a printer discovery function that enables said software application to determine an availability of access to an executing specialty printing module.

3. The apparatus of claim 1 including a means for said software application to determine an availability of access to one or more specialty printers via access to said specialty printing module.

4. The apparatus of claim 1 wherein said specialty printing module is accessible via a uniform resource locator (URL) address.

5. The apparatus of claim 1 wherein said specialty printing module provides an application programming interface to said software application that is configured for control of at least one type of specialty printer.

6. The apparatus of claim 5 wherein said application programming interface includes a pass through mode of operation wherein directives transmitted from said software application are re-transmitted by said specialty printing module without modification to a specialty printer.

7. The apparatus of claim 5 wherein said application programming interface is configured to enable said software application to direct a specialty printer to print a label onto printing media.

8. The apparatus of claim 5 wherein said application programming interface is configured to enable said label to be defined as a combination of one or more tables.

9. The apparatus of claim 5 wherein said printing media is a roll of paper and wherein said application programming interface is configured to enable said software application to direct said specialty printer to cut said printing media at a location relative to said label as printed onto said printing media.

10. The apparatus of claim 5 wherein said application programming interface is configured to enable said software application to print a sales receipt onto a specialty printer.

11. The apparatus of claim 1 wherein said specialty printing module directs printing of a report in accordance with a specification and data associated with said report.

12. The apparatus of claim 1 wherein said specialty printing module directs printing of a label in accordance with a specification and data associated with said label.

13. The apparatus of claim 1 wherein said specialty printing module directs printing of a document.

14. The apparatus of claim 5 wherein said media contains an RFID transponder.

15. The apparatus of claim 5 wherein said specialty printing module directs encoding of said RFID transponder in said media containing said RFID transponder.

16. The apparatus of claim 5 wherein said programming interface is accessible through a uniform resource locator (URL) address.

17. The apparatus of claim 5 wherein said programming interface further includes at least one return URL of a software component interfacing with said specialty printing module, said software application being executed upon completion of said printing via actions of said specialty printing module.

18. The apparatus of claim 17 wherein said programming interface enables return to said software application any data returned from said specialty printer in response to any communication between said specialty printer and said specialty printing module.

19. The apparatus of claim 1 wherein said first computing platform and said second computing platform are the same.

20. A system for enabling operation of a specialty printer to be controlled from a software application; said apparatus including:
  a specialty printing module that is configured for communicating with a software application and configured for communicating with a specialty printer, via at least one communication channel; said software application executing on a first platform and said specialty printing module executing on a second computing platform; and wherein
  said specialty printer module providing an applications programming interface for controlling said specialty printer that is configured for transferring information onto media and wherein control of said specialty printer is not accessible to said software application via said operating system or its associated device drivers; and wherein
  said specialty printing module providing control to said software application of said specialty printer, said control is not otherwise provided to said software application via said operating system and its associated device drivers.

21. The system of claim 20 wherein said first computing platform and said second computing platform are the same.

22. A method for enabling operation of a specialty printer to be controlled from a software application; said method including the steps of:
  providing a specialty printing module that is configured for communicating with a software application and configured for communicating with a specialty printer, via at least one communication channel; said software application executing on a first platform and said specialty printing module executing on a second computing platform; and wherein
  said specialty printer module providing an applications programming interface for controlling said specialty printer that is configured for transferring information onto media and wherein control of said specialty printer is not accessible to said software application via said operating system or its associated device drivers; and wherein
  said specialty printing module providing control to said software application of said specialty printer, said control is not otherwise provided to said software application via said operating system and its associated device drivers.

23. The method of claim 22 wherein said first computing platform and said second computing platform are the same.

* * * * *